United States Patent [19]

Sickert

[11] 4,399,061
[45] Aug. 16, 1983

[54] PREPARATION OF VIDEO DISC MOLDING COMPOSITION

[75] Inventor: Paulo Sickert, Indianapolis, Ind.

[73] Assignee: RCA Corporation, New York, N.Y.

[21] Appl. No.: 311,165

[22] Filed: Oct. 14, 1981

[51] Int. Cl.$^3$ .............................................. H01B 1/06
[52] U.S. Cl. ................................... 252/511; 524/567; 524/379
[58] Field of Search ................. 252/511; 260/23 XA, 260/37 R, 998.16; 358/128, 129; 523/174; 524/567, 568, 495, 379, 391

[56]  References Cited

U.S. PATENT DOCUMENTS 3,842,194 10/1974 Clemens ........................... 178/6.6 A
3,960,790  6/1976 Khanna ........................... 260/23 XA
4,151,132  4/1979 Khanna ........................... 252/511 X
4,228,050 10/1980 Martin et al. ................... 260/23 XA

OTHER PUBLICATIONS

Cyanamid Technical Information Bulletin No. D-24, Cyastat 609 Antistatic Agent.

Primary Examiner—Josephine Barr
Attorney, Agent, or Firm—Birgit E. Morris; R. Hain Swope

[57]  ABSTRACT

An improvement in preparing PVC resin based conductive molding compositions suitable for the manufacture of capacitive high density information discs wherein isopropyl alcohol is added to ingredients to be dry blended thus substantially reducing the amount of powder which accumulates on the inner surface of the mixing vessel during blending.

3 Claims, No Drawings

PREPARATION OF VIDEO DISC MOLDING COMPOSITION

This invention relates to the manufacture of capacitive high density information discs, i.e. video discs. More particularly, this invention relates to an improvement in preparing conductive polyvinylchloride-based molding compositions for video discs which enhances dispersion of the conductive particles therein.

BACKGROUND OF THE INVENTION

A capacitive video disc system has been described by Clemens in U.S. Pat. No. 3,842,194. The grooved video disc of Clemens had a conductive metal coating to provide the conductivity required for capacitive pickup and a thin layer of dielectric material thereover. An electrode on the playback stylus completed the capacitor.

Presently, video discs are prepared from a conductive plastic material such as disclosed by Martin et al in U.S. Pat. 4,228,050 issued Oct. 14, 1980, entitled "Conductive Molding Composition." The molding compositions described by Martin et al include a molding resin such as a vinyl chloride homopolymer or copolymer and a sufficient amount of a particulate conductive material, such as carbon black, so that the disc record can provide capacitive readout. The conductive capacitive information disc may be utilized with either a grooved or non-grooved information disc record system.

A conductive molding composition such as disclosed by Martin et al contains, in addition to sufficient conductive particles to provide capacitive readout without a conductive coating, additives such as flow modifiers, lubricants, stabilizers and the like. Such compositions containing large quantities of additives must be blended in a high intensity mixer such as a Henschel, Welex or Papenmeier type mixer to obtain the requisite homogeneity. It is preferred to blend certain of the powdered components of such molding compositions in dry form. This dry blending can be carried out at various stages in the preparation of the final conductive molding composition. The dry blending may also be carried out on the total composition or combinations of certain ingredients thereof. In most instances, dry blending will be carried out on a mixture of the polyvinylchloride resin and the conductive particles, preferably with one or more of the other powder ingredients of the formulation. It has been found that, regardless of what stage in the preparation of such a conductive molding composition dry blending is utilized, there is produced a buildup of powder around the walls of the mixer. Such "rings" of powder are predominately carbon black which has a tendency to separate from the blend due to its low bulk density.

The buildup of powder "rings" inside the mixer is, of course, disadvantageous in that such powder is not pure and is usually discarded because the cost of the analysis which would be required in order to recycle it is prohibitive. This separation of powder during dry blending will also change the proportions in the final mixture to a degree. This may be critical, for example, if a substantial quantity of an additive present in the formulation in minor amount is found in the "rings". Any deleterious effect on the homogeneity of the final composition which might be caused by the formation of powder "rings" in the mixer during dry blending can be potentially serious since the playback characteristics of the video disc are, in large measure, dependent on the disc having uniform electrical properties. In accordance with this invention, there is provided a means whereby the homogeneity of the conductive molding composition is enhanced and the powder buildup on the mixer virtually eliminated.

SUMMARY OF THE INVENTION

In accordance with this invention, a small amount of isopropanol is utilized as an adjunct in the preparation of a conductive molding composition for a capacitive information disc record which has uniform and predetermined performance properties. The isopropanol is added to the conductive molding composition, or a portion thereof, which is dry blended during the preparation of the final composition. The use of isopropanol as an aid to dry blending enhances both the effort and time required to achieve homogeniety and, unexpectedly, virtually eliminates powder buildup on interior surfaces of the mixer during dry blending.

DETAILED DESCRIPTION OF THE INVENTION

The conductive molding composition for a capacitive high density information disc record in accordance with this invention, in general, comprises: a polymer of vinyl chloride; finely divided conductive particles, e.g. carbon black; a stabilizer system, generally a mixture of tin salts; a lubricant system, generally composed of both an internal lubricant to modify the melt viscosity of the molding composition during processing, and an external lubricant to provide release of the molded article, herein described as a video disc, from the mold; and a flow modifier system, generally composed of plasticizers and processing aids, which reduces the melt viscosity of the molding composition during processing.

The above-described conductive molding composition contains from about 12 up to about 20 percent by weight of carbon black or even higher, depending on the type of carbon black used and the dispersion obtainable. Several processing aids and plasticizers are required to obtain the requisite melt flow properties for compression molding the information disc, which contains information as very small surface relief patterns in a very shallow information track.

The polyvinylchloride (PVC) resins suitable for manufacture of the video disc include polymers and copolymers of vinylchloride and mixtures thereof. The PVC resin should have a high heat distortion temperature, preferably 140° F. (60° C.) and above, to produce video discs having certain desirable characteristics. Suitable polymers include homopolymers of vinyl chloride such as Geon 110X 346 resin of the B. F. Goodrich Company which has a $T_g$ of 88° C., Great American Chemical Company's 550 resin and Air Products's 2160 resin. Also suitable is a vinylchloride-polypropylene copolymer known as AP480 from Air Products & Chemicals, Inc., which has a $T_g$ of 76° C.

Conductive particles suitable for use in the subject molding compositions include highly electrically conductive, finely divided carbon blacks, preferably those having a large surface area thereby reducing loading requirements. Presently preferred are Cabot CSX-175, available from Cabot Corporation and Ketjenblack EC, a product of the Armak Company. Other carbon blacks can also be employed, in whole or in part, provided they meet specified electrical requirements. Denser particles of carbon will generally require higher loading, e.g., up to about 35–40 percent by weight of the molding composition, to obtain an equivalent electrical conductivity in the final product.

From about 1.5–4 percent by weight of stabilizers are added to the chosen PVC-carbon black composition. Suitable stabilizers include organotin compounds such as dibutyltin-β-mercaptopropionate, commercially available as T-35 from M & T Chemical Company, Inc., dibutyltin maleate, commercially available as Mark 275 from Argus Chemical Company, and stabilizers such as barium-lead stearate, commercially available as Q-232B from Argus Chemical Company, and the like. Stabilizers act primarily to scavenge volatile decomposition products of the PVC resin, particularly hydrogen chloride. Preferably, combinations of two or more stabilizers are utilized in the subject molding compositions.

Suitable lubricants for PVC resins are well known and include fatty acids and esters of alcohols and fatty acids, soaps, fatty acid amides and the like. At least two lubricants should be employed to prevent excessive bleed out of the lubricant during the molding process and to provide both internal and external lubrication. Suitable lubricants include Loxiol G-30, a mixture of monofatty acid esters of varying molecular weight alcohols and acids and Loxiol G-70, a polyfunctional complex ester of saturated fatty acids, both commercially available from Henkel International GmbH; a room temperature solid esterified montan wax commercially available as Wax E of the Hoechst Company; calcium, zinc or lead stearates and the like. Sufficient lubricants must be added to prevent high shear heating during processing and to provide good release from the mold. Generally, the lubricant system comprises from about 1 to about 3 percent by weight of the molding composition.

Additional modifiers including plasticizers and processing aids are also added to the molding composition in amounts up to about 10 percent by weight to improve the processing and molding characteristics thereof. Suitable plasticizers include, for example, chlorinated paraffin waxes such as Unichlor 70AX from Neville Chemical Company, glyceryl tribenzoate commercially available as Benzoflex S-404 from Velsicol Chemical Corporation, epoxidized soybean oils commercially available as Paraplex G-62 from Rohm & Haas Company, Santicizer 711, a primary phthalate plasticizer of the Monsanto Company, Kodaflex NP10, a polymeric ester plasticizer from Eastman Chemical Products, dicyclohexylphthalate, and various processing aid such as the acrylic modifiers commercially available as K-147 and K-175 from Rohm & Haas Company. Other modifiers are well known.

In preparing the conductive molding composition, the liquid ingredients may be initially combined with certain of the dry ingredients or added to the mixture of dry ingredients after dry blending. The finished molding composition is heated to melting temperature, extruded and pelletized for storage. The pellets are then compression molded into video disc replicas in a conventional manner, e.g., forming a pre-form and compression molding using a 30–60 second cycle at about 325°–380° F. (163°–190° C.) and removing the flashing.

It is readily appreciated that the subject conductive molding composition is very complex and that the desirable properties and characteristics of video discs compression molded therefrom are the result of careful balancing of the physical and chemical properties of the various ingredients of the formulation. Even though a formulation had been developed which produces superior video discs, the problem of carbon black and other materials accumulating on the inside of the mixer during dry blending has remained. A solution to this problem is provided in accordance with this invention.

In accordance with this invention, this buildup of powder in the mixer is substantially eliminated by the addition to the ingredients being blended in a dry state of a minor amount, i.e. an amount not greater than about 2 percent by weight, based on the total conductive composition, of isopropyl alcohol, i.e. isopropanol. Preferably, from about 0.5 to about 1.5 percent by weight of isopropyl alcohol is added to the dry blend. The addition of 1 percent by weight of isopropyl alcohol to the dry blend is particularly preferred. The presence of isopropyl alcohol improves the dry blending both by reducing the powder "rings" and by enhancing the dispersion of the carbon black in the dry composition. Isopropyl alcohol is clearly superior to other substances tested, including a commercial antistatic agent. More important, however, is that isopropyl alcohol, in contrast to all other agents tested, had no adverse effect whatsoever on the formulation during further processing and molding into video discs. As previously pointed out, the overall effect of any additive or component of the formulation on the performance of the finished video disc is the single most critical factor in its selection.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

The basic molding composition for this Example consisted of: 76 parts of Geon 110X 346, polyvinylchloride of the B. F. Goodrich Co.; 15 parts of Cabot CSX 175, carbon black of the Cabot Corporation; 1.5 parts of dibutyltin-beta-mercaptopropionate, commercially available as T-35 from M & T Chemical Company, Inc.; 1.0 part of Mark 275, dibutyltin maleate of Argus Chemical Co.; 2.0 parts of Acryloid K-147 and 0.75 part of Acryloid K-175, acrylic modifiers of Rohm & Haas Co.; 0.5 part of Loxiol G-30 and 0.25 part of Loxiol G-70, lubricants of Henkel International GmbH; 1.0 part of calcium stearate and 2.0 parts of diundecyl phthalate. This formula served as the control. Wherein an additive was included in the formulation as described below, a corresponding amount of the polyvinylchloride was removed.

Each formulation was blended in a Waring blender running at low speed for ten minutes. The mixture was allowed to cool in the blender for three minutes after which it was removed and the blender examined for powder rings. The control formulation produced a wide "ring" of powder, mostly carbon black, covering approximately one-third of the inner wall of the blender. Additional powder was noted at the bottom and under the blades. The total powder deposited amounted to 2.66 percent of the original formulation.

A second formulation containing 1 part of Cyastat 609 was processed in a similar manner. Cyastat 609 is a 50 percent solution of N,N-bis(2-hydroxyethyl)-N-(3'-dodecyloxy-2'-hydroxypropyl)methylammonium methosulfate in a mixture of isopropyl alcohol and water available from American Cyanamid Chemical Co. The Cyastat 609, which is recommended as an antistatic agent for milled and molded polyvinylchloride, left a powder buildup of 1.7 percent of the original formulation. A third formulation containing 1 part of isopropyl alcohol left a powder buildup of only 0.8 percent. A fourth formulation containing 1 part of toluene left only traces of powder in the blender.

EXAMPLE 2

In order to demonstrate the effect of the various additives of Example 1 on the formulation and compression molding thereof into video discs, the following experiments were performed.

A dynamic heat stability test was conducted in the Haake Rheocord Torque Rheometer using, in each instance, 55 g of dry blend, 170° starting temperature, 1.0 damping, 5/50 range, and 100 rpm. The results are reported in Table I. The break point in this test is the point where the polyvinylchloride begins to lose HCl. At this point, the polyvinylchloride begins to cross-link with a corresponding increase in viscosity. This will produce a distinct change in torque, usually with a corresponding temperature rise.

TABLE I

|  | Conrol | Cyastat 609 | Isopropyl Alcohol | Toluene |
| --- | --- | --- | --- | --- |
| Equilibrium Torque | 1250 MG | 1400 MG | 1300 MG | 1300 MG |
| Equilibrium Time | 7–30 Min. | 4–11 Min. | 5–23 Min. | 6–16 Min. |
| Equilibrium Melt Temperature | 200° | 202° | 201° | 203° |
| Breakpoint Observations | at 30 Min. Stickage at 40 Minutes | at 20 Min. Severe stickage at 30 Minutes | at 34 Min. Light stickage at 44 Minutes | at 16 Min. Severe stickage at 26 Minutes |

TABLE II

|  | Control | Cyastat 609 | Isopropyl Alcohol | Toluene |
| --- | --- | --- | --- | --- |
| Totalizer |  |  |  |  |
| 16,500 Mg | 7.5 Min. | 7.0 Min. | 7.5 Min. | 7.0 Min. |
| 24,000 Mg | 12.5 Min. | 11.5 Min. | 12.0 Min. | 11.25 Min. |
| Final Torque | 1250 Mg | 1375 Mg | 1325 Mg | 1300 Mg |
| Final Temp. | 190° | 192° | 193° | 194° |
| Lubricity | Acceptable | Acceptable | Acceptable | Gummy |
| Release | No stickage | No stickage | No stickage | Poor, severe stickage |
| Plaque | Glossy, No visible stain | Glossy, No visible stain | Glossy, No visible stain | Heavy staining |

A viscosity/release test was then performed on 55 g samples of the four formulations utilizing the same equipment, 177° starting temperature, 1.0 damping and 50 rpm. Total torque was monitored on each sample and the time required to reach 16,500 and 24,000 Mg, respectively, was noted. When the total torque reached 24,000 Mg, the apparatus was automatically turned off and the blended composition removed. Final torque and temperature were noted as well as the lubricity of the material and whether it had a tendency to stick to the machine.

The compositions were removed from the Haake apparatus and individually rolled into balls by hand. Each ball in turn was placed in a heated hydraulic press between two stainless steel plates. A plaque was formed from each ball by compression at 10,000 psi, 350° F. for two minutes. The plaques were examined for appearance, particularly for staining, and ease of removal from the plates was noted. The results of these experiments are noted in Table II.

It is readily apparent from a consideration of the results presented herein that isopropyl alcohol is the most advantageous agent for alleviating the problem of powder accumulation on the inside of the mixer, both in terms of its effect on the powder buildup itself and its overall positive effect on the formulation.

I claim:

1. In a process for preparing a conductive vinyl chloride resin based molding composition containing at least about 12 percent by weight of conductive carbon black particles wherein certain components of said composition, including said resin and carbon black, are mixed in the dry state in a mixing vessel, said mixing having the tendency to deposit powder onto the inner surface of said vessel, the improvement comprising adding to said dry components an amount of isopropyl alcohol sufficient to substantially reduce the amount of powder deposited on said surface during mixing, but not exceeding about 2 percent by weight of said composition.

2. A process in accordance with claim 1, wherein the amount of isopropyl alcohol added comprises from about 0.5 to about 1.5 percent by weight of said conductive molding composition.

3. A process in accordance with claim 1, wherein the amount of isopropyl alcohol added comprises about 1 percent by weight of said conductive molding composition.

* * * * *